(12) United States Patent
Brake, Jr. et al.

(10) Patent No.: US 7,263,507 B1
(45) Date of Patent: Aug. 28, 2007

(54) CUSTOMER ACTIVATED MULTI-VALUE (CAM) CARD

(75) Inventors: Francis B. Brake, Jr., Swarthmore, PA (US); Deborah Schwartz, Wynnewood, PA (US); Jennifer Zimmerman, Middletown, DE (US)

(73) Assignee: JP Morgan Chase Bank, N.A., New York, NY (US)

( * ) Notice: Subject to any disclaimer, the term of this patent is extended or adjusted under 35 U.S.C. 154(b) by 0 days.

(21) Appl. No.: 11/134,638

(22) Filed: May 20, 2005

Related U.S. Application Data

(60) Division of application No. 10/370,227, filed on Feb. 20, 2003, now Pat. No. 7,072,864, which is a division of application No. 09/505,189, filed on Feb. 16, 2000, now Pat. No. 6,865,547, which is a continuation of application No. 09/193,712, filed on Nov. 17, 1998, now Pat. No. 6,032,136.

(51) Int. Cl.
*G07F 7/08* (2006.01)
*G07F 7/12* (2006.01)

(52) U.S. Cl. .............................. 705/41; 705/39; 705/44; 235/380; 235/381; 235/382

(58) Field of Classification Search .................. 705/14, 705/35, 39–42, 38, 33, 44; 235/380–382
See application file for complete search history.

(56) References Cited

U.S. PATENT DOCUMENTS 3,634,669 A   1/1971   Wyckoff et al.

(Continued)

FOREIGN PATENT DOCUMENTS

CA   2293321   12/1998

(Continued)

OTHER PUBLICATIONS

HTTP://WWW.DELARUE/, De La Rue takes loyltalty on step further with prolific—multi-application smart loyalty card to meet market demand, De La Rue PLC Oct. 19, 1998 (2 pages).*

(Continued)

*Primary Examiner*—Cuong Nguyen
(74) *Attorney, Agent, or Firm*—Hunton & Williams LLP

(57) ABSTRACT

The Customer Activated Multi-Value (CAM) card provides a customer with a primary use as a transaction card which can be further activated to have a secondary use as a credit card. The CAM card can be activated as a transaction card or as a transaction card with a credit card feature. Activation of the CAM card as a transaction card allows the customer to purchase goods and services from one specific vendor and to establish a relationship with that vendor for the goods or services rendered (for example, telephone calling card or gasoline product purchasing card) while enjoying reward benefits based on those purchases. Activation of the credit feature of the card allows the customer to interact with any merchant that accepts traditional credit cards such as VISA®, MASTERCARD®, AMERICAN EXPRESS®, or DISCOVER®. The combination of features allows a customer to purchase various goods and services from several different merchants. If the customer chooses to activate the CAM card as both a transaction card and a credit card, the customer is given the benefit of using the card in both manners described above.

15 Claims, 6 Drawing Sheets

U.S. PATENT DOCUMENTS

| | | |
|---|---|---|
| 3,946,206 A | 3/1976 | Darjany |
| 4,047,033 A | 9/1977 | Maimberg |
| 4,465,206 A | 8/1984 | Sorel et al. |
| 4,545,838 A | 10/1985 | Minkus |
| 4,582,985 A | 4/1986 | Lofberg |
| 4,614,861 A | 9/1986 | Pavlov et al. |
| 4,634,845 A | 1/1987 | Riley |
| 4,689,478 A | 8/1987 | Hale et al. |
| 4,700,055 A | 10/1987 | Kashkashian, Jr. |
| 4,746,787 A | 5/1988 | Okada |
| 4,750,119 A | 6/1988 | Robertson |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,822,985 A | 4/1989 | Boggan et al. |
| 4,831,242 A | 5/1989 | Englehardt |
| 4,831,526 A | 5/1989 | Luchs |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Elliot et al. |
| 4,968,873 A | 11/1990 | Dethloff et al. |
| 4,975,840 A | 12/1990 | DeTore et al. |
| 4,978,401 A | 12/1990 | Bonomi |
| 4,992,940 A | 2/1991 | Dworkin |
| 5,025,372 A | 6/1991 | Burton |
| 5,049,728 A | 9/1991 | Rovin |
| 5,055,662 A | 10/1991 | Hasegawa |
| 5,056,019 A | 10/1991 | Schultz et al. |
| 5,080,748 A | 1/1992 | Bonomi |
| 5,095,194 A | 3/1992 | Barbanell |
| 5,117,355 A | 5/1992 | McCarthy |
| 5,175,416 A | 12/1992 | Mansvelt |
| 5,180,901 A | 1/1993 | Hiramatsu |
| 5,192,947 A | 3/1993 | Neustein |
| 5,202,286 A | 4/1993 | Nakatani |
| 5,202,826 A | 4/1993 | McCarthy |
| 5,206,803 A | 4/1993 | Vitagliano |
| 5,218,631 A | 6/1993 | Katz |
| 5,247,190 A | 9/1993 | Friend et al. |
| 5,276,311 A | 1/1994 | Hennige |
| 5,287,268 A | 2/1994 | McCarthy |
| 5,287,269 A | 2/1994 | Dorrough |
| 5,297,026 A | 3/1994 | Hoffman |
| 5,311,594 A | 5/1994 | Penzias |
| 5,326,959 A | 7/1994 | Perazza |
| 5,326,960 A | 7/1994 | Tannenbaum |
| 5,328,809 A | 7/1994 | Holmes et al. |
| 5,339,239 A | 8/1994 | Manabe |
| 5,349,633 A | 9/1994 | Katz |
| 5,350,906 A | 9/1994 | Brody |
| 5,359,183 A | 10/1994 | Skodlar |
| 5,365,575 A | 11/1994 | Katz |
| 5,383,113 A | 1/1995 | Kight et al. |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,424,524 A | 6/1995 | Ruppert |
| 5,450,477 A | 9/1995 | Amarant |
| 5,453,601 A | 9/1995 | Rosen |
| 5,455,407 A | 10/1995 | Rosen |
| 5,457,305 A * | 10/1995 | Akel et al. .................... 705/45 |
| 5,459,306 A | 10/1995 | Stein et al. |
| 5,465,206 A | 11/1995 | Hilt |
| 5,466,919 A | 11/1995 | Hovakimian |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,482,139 A | 1/1996 | Rivalto |
| 5,483,444 A | 1/1996 | Malark |
| 5,483,445 A | 1/1996 | Pickering |
| 5,500,514 A | 3/1996 | Veeneman |
| 5,511,114 A | 4/1996 | Stimson |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik et al. |
| 5,537,314 A | 7/1996 | Kanter |
| 5,544,086 A | 8/1996 | Davis |
| 5,544,246 A | 8/1996 | Mandelbaum |
| 5,553,120 A | 9/1996 | Katz |
| 5,577,109 A | 11/1996 | Stimson |
| 5,578,808 A | 11/1996 | Taylor |
| 5,581,064 A | 12/1996 | Riley et al. |
| 5,585,787 A | 12/1996 | Wallerstein |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,621,640 A | 4/1997 | Burke |
| 5,621,787 A | 4/1997 | McKoy |
| 5,621,812 A | 4/1997 | Deaton et al. |
| 5,637,845 A | 6/1997 | Kolls |
| 5,638,457 A | 6/1997 | Deaton et al. |
| 5,642,279 A | 6/1997 | Stone |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle |
| 5,653,914 A | 8/1997 | Holmes et al. |
| 5,664,110 A | 9/1997 | Green |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio |
| 5,675,662 A | 10/1997 | Deaton et al. |
| 5,677,955 A | 10/1997 | Doggett |
| 5,684,291 A | 11/1997 | Taskett |
| 5,687,322 A | 11/1997 | Deaton et al. |
| 5,689,100 A | 11/1997 | Carrithers |
| 5,689,650 A | 11/1997 | McClelland et al. |
| 5,692,132 A | 11/1997 | Hogan |
| 5,696,907 A | 12/1997 | Tom |
| 5,699,528 A | 12/1997 | Hogan |
| 5,703,344 A | 12/1997 | Bezy et al. |
| 5,704,046 A | 12/1997 | Hogan |
| 5,705,798 A | 1/1998 | Tarbox |
| 5,708,422 A | 1/1998 | Blonder |
| 5,710,458 A | 1/1998 | Iwasaki |
| 5,710,886 A | 1/1998 | Christensen |
| 5,710,887 A | 1/1998 | Chelliah |
| 5,710,889 A | 1/1998 | Clark et al. |
| 5,715,399 A | 2/1998 | Bezos |
| 5,721,768 A | 2/1998 | Stimson |
| 5,721,781 A | 2/1998 | Deo et al. |
| 5,727,153 A | 3/1998 | Powell |
| 5,728,998 A | 3/1998 | Novis et al. |
| 5,729,693 A | 3/1998 | Holda-Fleck |

| | | | | | | |
|---|---|---|---|---|---|---|
| 5,734,154 A | 3/1998 | Jachimowicz et al. | | 5,937,068 A | 8/1999 | Audebert |
| 5,734,838 A | 3/1998 | Robinson | | 5,940,811 A | 8/1999 | Norris |
| 5,736,728 A | 4/1998 | Matsubara | | 5,952,641 A | 9/1999 | Korshun |
| 5,737,421 A | 4/1998 | Audebert | | 5,953,423 A | 9/1999 | Rosen |
| 5,740,549 A | 4/1998 | Reilly et al. | | 5,953,710 A | 9/1999 | Fleming |
| 5,742,775 A | 4/1998 | King | | 5,955,961 A | 9/1999 | Wallerstein |
| 5,745,049 A | 4/1998 | Akiyama et al. | | 5,963,648 A | 10/1999 | Rosen |
| 5,745,706 A | 4/1998 | Wolfberg et al. | | 5,970,479 A | 10/1999 | Shepherd |
| 5,749,075 A | 5/1998 | Toader et al. | | 5,970,480 A | 10/1999 | Kalina |
| 5,760,381 A | 6/1998 | Stich | | 5,974,399 A | 10/1999 | Giuliani et al. |
| 5,765,141 A | 6/1998 | Spector | | RE36,365 E | 11/1999 | Levine et al. |
| 5,770,843 A | 6/1998 | Rose | | 5,984,191 A | 11/1999 | Chapin, Jr. |
| 5,770,849 A | 6/1998 | Novis et al. | | 5,987,434 A | 11/1999 | Libman |
| 5,774,870 A | 6/1998 | Storey | | 5,988,509 A | 11/1999 | Taskett |
| 5,777,305 A | 7/1998 | Smith | | 5,991,413 A | 11/1999 | Arditti et al. |
| 5,777,306 A | 7/1998 | Masuda | | 5,991,748 A | 11/1999 | Taskett |
| 5,777,903 A | 7/1998 | Piosenka et al. | | 5,991,750 A | 11/1999 | Watson |
| 5,778,067 A | 7/1998 | Jones et al. | | 6,000,608 A * | 12/1999 | Dorf ......................... 235/380 |
| 5,787,156 A | 7/1998 | Katz | | 6,000,832 A | 12/1999 | Franklin et al. |
| 5,787,404 A | 7/1998 | Fernandez-Holman | | 6,002,383 A | 12/1999 | Shimada |
| 5,789,733 A | 8/1998 | Jachimowicz et al. | | 6,003,762 A | 12/1999 | Hayashida |
| 5,794,207 A | 8/1998 | Walker et al. | | 6,004,681 A | 12/1999 | Epstein et al. |
| 5,799,087 A | 8/1998 | Rosen | | 6,006,988 A | 12/1999 | Behrmann et al. |
| 5,802,176 A | 9/1998 | Audebert | | 6,009,415 A | 12/1999 | Shurling et al. |
| 5,805,719 A | 9/1998 | Pare et al. | | 6,014,636 A | 1/2000 | Reeder |
| 5,806,042 A | 9/1998 | Kelly et al. | | 6,014,638 A | 1/2000 | Burge et al. |
| 5,806,044 A | 9/1998 | Powell | | 6,014,645 A * | 1/2000 | Cunningham ................ 705/38 |
| 5,806,045 A | 9/1998 | Biorge | | 6,014,749 A | 1/2000 | Gloor et al. |
| 5,807,627 A | 9/1998 | Friend et al. | | 6,016,482 A | 1/2000 | Molinari et al. |
| 5,809,478 A | 9/1998 | Greco | | 6,016,954 A | 1/2000 | Abe |
| 5,815,657 A | 9/1998 | Williams et al. | | 6,018,718 A | 1/2000 | Walker et al. |
| 5,815,658 A | 9/1998 | Kuriyama | | 6,019,284 A | 2/2000 | Freeman et al. |
| 5,819,234 A | 10/1998 | Slavin et al. | | 6,026,370 A | 2/2000 | Jermyn |
| 5,819,237 A | 10/1998 | Garman | | 6,029,139 A | 2/2000 | Cunningham et al. |
| 5,832,457 A | 11/1998 | O'Brien | | 6,029,890 A | 2/2000 | Austin |
| 5,835,061 A | 11/1998 | Stewart | | 6,032,136 A * | 2/2000 | Brake et al. .................. 705/41 |
| 5,835,576 A | 11/1998 | Katz | | 6,036,099 A | 3/2000 | Leighton |
| 5,839,113 A | 11/1998 | Federau et al. | | 6,038,292 A | 3/2000 | Thomas |
| 5,845,259 A | 12/1998 | West | | 6,038,552 A | 3/2000 | Fleischl |
| 5,845,260 A | 12/1998 | Nakano et al. | | 6,041,315 A | 3/2000 | Pollin |
| 5,852,811 A | 12/1998 | Atkins | | 6,045,042 A | 4/2000 | Ohno |
| 5,852,812 A | 12/1998 | Reeder | | 6,047,067 A | 4/2000 | Rosen |
| 5,857,079 A | 1/1999 | Claus | | 6,049,463 A | 4/2000 | O'Malley et al. |
| 5,857,175 A | 1/1999 | Day | | 6,049,773 A | 4/2000 | McCormack et al. |
| 5,857,709 A | 1/1999 | Chock | | 6,049,782 A | 4/2000 | Gottesman et al. |
| 5,859,419 A | 1/1999 | Wynn | | 6,058,378 A | 5/2000 | Clark et al. |
| 5,864,609 A | 1/1999 | Cross | | 6,061,660 A | 5/2000 | Eggleston et al. |
| 5,864,828 A | 1/1999 | Atkins | | 6,064,985 A | 5/2000 | Anderson |
| 5,864,830 A | 1/1999 | Armetta | | 6,065,675 A | 5/2000 | Teicher |
| 5,870,718 A | 2/1999 | Spector | | 6,068,183 A | 5/2000 | Freeman et al. |
| 5,870,721 A | 2/1999 | Norris | | 6,070,147 A | 5/2000 | Harms et al. |
| 5,875,437 A | 2/1999 | Atkins | | 6,070,153 A | 5/2000 | Simpson |
| 5,883,377 A | 3/1999 | Chapin, Jr. | | 6,076,068 A | 6/2000 | DeLapa et al. |
| 5,883,810 A | 3/1999 | Franklin | | 6,076,072 A | 6/2000 | Libman |
| 5,884,271 A | 3/1999 | Pitroda | | 6,078,888 A | 6/2000 | Johnson, Jr. |
| 5,884,278 A | 3/1999 | Powell | | 6,078,891 A | 6/2000 | Riordan et al. |
| 5,884,285 A | 3/1999 | Atkins | | 6,091,817 A | 7/2000 | Bertina et al. |
| 5,887,065 A | 3/1999 | Audebert | | 6,092,056 A | 7/2000 | Tull, Jr. et al. |
| 5,890,138 A | 3/1999 | Godin et al. | | 6,095,412 A | 8/2000 | Bertina et al. |
| 5,890,140 A | 3/1999 | Clark et al. | | 6,095,416 A | 8/2000 | Grant et al. |
| H1794 H | 4/1999 | Claus | | 6,098,053 A | 8/2000 | Slater |
| 5,897,620 A | 4/1999 | Walker et al. | | 6,105,011 A | 8/2000 | Morrison, Jr. |
| 5,905,246 A | 5/1999 | Fajkowski | | 6,105,865 A | 8/2000 | Hardesty |
| 5,911,135 A | 6/1999 | Atkins | | 6,109,525 A | 8/2000 | Blomqvist et al. |
| 5,911,136 A | 6/1999 | Atkins | | 6,115,458 A | 9/2000 | Taskett |
| 5,920,629 A | 7/1999 | Rosen | | 6,119,932 A | 9/2000 | Maloney et al. |
| 5,920,844 A | 7/1999 | Hotta et al. | | 6,122,623 A | 9/2000 | Garman |
| 5,920,847 A | 7/1999 | Kolling et al. | | 6,128,598 A | 10/2000 | Walker et al. |
| 5,923,734 A | 7/1999 | Taskett | | 6,128,599 A | 10/2000 | Walker et al. |
| 5,926,800 A | 7/1999 | Baronowski | | 6,129,274 A | 10/2000 | Suzuki |
| 5,930,217 A | 7/1999 | Kayanuma | | 6,134,536 A | 10/2000 | Shepherd |
| 5,931,764 A | 8/1999 | Freeman et al. | | 6,138,917 A | 10/2000 | Chapin, Jr. |
| 5,933,817 A | 8/1999 | Hucal | | 6,145,741 A | 11/2000 | Wisdom et al. |

| | | |
|---|---|---|
| 6,148,297 A | 11/2000 | Swor et al. |
| 6,161,096 A | 12/2000 | Bell |
| 6,163,770 A | 12/2000 | Gamble et al. |
| 6,164,533 A | 12/2000 | Barton |
| 6,167,385 A | 12/2000 | Hartley-Urquhart |
| 6,169,975 B1 | 1/2001 | White et al. |
| 6,173,267 B1 | 1/2001 | Cairns |
| 6,182,048 B1 | 1/2001 | Osborn et al. |
| 6,182,894 B1 | 2/2001 | Hackett et al. |
| 6,186,793 B1 | 2/2001 | Brubaker |
| 6,189,787 B1 | 2/2001 | Dorf |
| 6,195,644 B1 | 2/2001 | Bowie |
| 6,199,762 B1 * | 3/2001 | Hohle ................. 235/492 |
| 6,202,053 B1 | 3/2001 | Christiansen et al. |
| RE37,122 E | 4/2001 | Levine et al. |
| 6,227,447 B1 | 5/2001 | Campisano |
| 6,243,688 B1 | 6/2001 | Kalina |
| 6,263,316 B1 | 7/2001 | Khan et al. |
| 6,265,977 B1 | 7/2001 | Vega et al. |
| 6,278,981 B1 | 8/2001 | Dembo et al. |
| 6,295,522 B1 | 9/2001 | Boesch |
| 6,298,336 B1 | 10/2001 | Davis et al. |
| 6,308,268 B1 | 10/2001 | Audebert |
| 6,336,099 B1 | 1/2002 | Barnett et al. |
| 6,341,724 B2 | 1/2002 | Campisano |
| 6,343,743 B1 | 2/2002 | Lamla |
| 6,345,261 B1 | 2/2002 | Feidelson |
| 6,345,766 B1 | 2/2002 | Taskett et al. |
| 6,349,291 B1 | 2/2002 | Varma |
| 6,360,954 B1 | 3/2002 | Barnardo |
| 6,373,969 B1 | 4/2002 | Adler |
| 6,385,591 B1 | 5/2002 | Mankoff |
| 6,386,444 B1 | 5/2002 | Sullivan |
| 6,397,202 B1 | 5/2002 | Higgins et al. |
| 6,402,039 B1 | 6/2002 | Freeman et al. |
| 6,405,182 B1 | 6/2002 | Cuervo |
| 6,422,459 B1 | 7/2002 | Kawan |
| 6,422,462 B1 | 7/2002 | Cohen |
| 6,429,927 B1 | 8/2002 | Borza |
| 6,434,259 B1 | 8/2002 | Hamid et al. |
| 6,446,210 B1 | 9/2002 | Borza |
| 6,450,407 B1 | 9/2002 | Freeman et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,484,144 B2 | 11/2002 | Martin et al. |
| 6,484,148 B1 | 11/2002 | Boyd |
| 6,498,861 B1 | 12/2002 | Hamid et al. |
| 6,505,168 B1 | 1/2003 | Rothman et al. |
| 6,505,780 B1 | 1/2003 | Yassin et al. |
| 6,529,880 B1 | 3/2003 | McKeen et al. |
| 6,560,578 B2 | 5/2003 | Eldering |
| 6,574,603 B1 | 6/2003 | Dickson et al. |
| 6,581,839 B1 | 6/2003 | Lasch et al. |
| 6,601,761 B1 | 8/2003 | Katis |
| 6,609,111 B1 | 8/2003 | Bell |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,675,127 B2 | 1/2004 | LaBlanc et al. |
| 6,693,544 B1 | 2/2004 | Hebbecker |
| 6,745,938 B2 | 6/2004 | Sullivan |
| 6,802,008 B1 | 10/2004 | Ikefuji et al. |
| 6,805,287 B2 | 10/2004 | Bishop |
| 6,865,547 B1 * | 3/2005 | Brake et al. ................. 705/41 |
| 6,868,426 B1 | 3/2005 | Mankoff |
| 6,999,943 B1 * | 2/2006 | Johnson et al. ............ 705/39 |
| 7,072,864 B2 * | 7/2006 | Brake et al. ................. 705/41 |
| 2001/0027441 A1 | 10/2001 | Wankmueller |
| 2001/0034682 A1 | 10/2001 | Knight et al. |
| 2001/0044293 A1 | 11/2001 | Morgan |
| 2001/0047342 A1 | 11/2001 | Cuervo |
| 2001/0054003 A1 * | 12/2001 | Chien et al. ................. 705/14 |
| 2001/0056398 A1 | 12/2001 | Scheirer |
| 2002/0026418 A1 | 2/2002 | Koppel et al. |
| 2002/0046255 A1 | 4/2002 | Moore et al. |
| 2002/0062235 A1 | 5/2002 | Wahlbin et al. |
| 2002/0077978 A1 | 6/2002 | O'Leary et al. |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0104878 A1 | 8/2002 | Seifert et al. |
| 2002/0116271 A1 | 8/2002 | Mankoff |
| 2002/0120627 A1 | 8/2002 | Mankoff |
| 2002/0143703 A1 | 10/2002 | Razvan |
| 2002/0147662 A1 | 10/2002 | Anderson |
| 2002/0165820 A1 | 11/2002 | Anvekar et al. |
| 2002/0174016 A1 | 11/2002 | Cuervo |
| 2003/0004828 A1 | 1/2003 | Epstein |
| 2003/0004867 A1 * | 1/2003 | Kight et al. ................. 705/39 |
| 2003/0023549 A1 | 1/2003 | Armes et al. |
| 2003/0028518 A1 | 2/2003 | Mankoff |
| 2003/0046249 A1 | 3/2003 | Wu |
| 2003/0053609 A1 | 3/2003 | Risafi et al. |
| 2003/0069842 A1 * | 4/2003 | Kight et al. ................. 705/39 |
| 2003/0101119 A1 | 5/2003 | Persons et al. |
| 2003/0105672 A1 | 6/2003 | Epstein et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0163403 A1 | 8/2003 | Chen et al. |
| 2003/0172040 A1 | 9/2003 | Kemper et al. |
| 2003/0195808 A1 | 10/2003 | Brown et al. |
| 2003/0200180 A1 | 10/2003 | Phelan et al. |
| 2003/0216965 A1 | 11/2003 | Libman |
| 2004/0024672 A1 | 2/2004 | Brake, Jr. et al. |
| 2004/0030626 A1 | 2/2004 | Libman |
| 2004/0039588 A1 | 2/2004 | Libman |
| 2004/0039695 A1 * | 2/2004 | Rowe ......................... 705/39 |
| 2004/0039702 A1 * | 2/2004 | Blair et al. ................. 705/43 |
| 2004/0098351 A1 | 5/2004 | Duke |
| 2004/0111370 A1 * | 6/2004 | Saylors et al. ............. 705/40 |
| 2004/0243498 A1 | 12/2004 | Duke |
| 2004/0249752 A1 * | 12/2004 | Prato et al. ................. 705/41 |
| 2005/0027649 A1 | 2/2005 | Cech |
| 2005/0033637 A1 * | 2/2005 | Underwood ................. 705/14 |
| 2005/0071230 A1 | 3/2005 | Mankoff |
| 2005/0075932 A1 | 4/2005 | Mankoff |
| 2005/0077350 A1 * | 4/2005 | Courtion et al. ............ 235/380 |
| 2005/0080672 A1 | 4/2005 | Courtion et al. |

FOREIGN PATENT DOCUMENTS

| | | |
|---|---|---|
| EP | 959440 | 11/1999 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 99/05633 | 2/1999 |
| WO | WO 01/69347 A2 | 9/2001 |
| WO | WO 01/69347 A3 | 9/2001 |
| WO | WO 2005/043277 | 5/2005 |

OTHER PUBLICATIONS

Cathy Colins et al., from http://www.delarue.com, De La Rue Provides Hurricane Aid, Nov. 12, 1998 (2 pages).*

Unknown, from http://www.delarue.com, Visa, MBNA and De La Rue Launch Multi-Function Smart Card Program, De La Rue PCL, Jul. 06, 1998, 2 pages.*

Unknown, from http://www.delarue.com, Interview with Amedeo D'Angelo: Managing Director—De La Rue Card Systems, Oct. 1997, 2 pages.*
Unknown, from http://www.delarue.com, De La Rue The standard setter—SIMphonIC SIM Toolkit —"First Ever" standard provider for converging markets, De La Rue PLD, Mar. 18, 1999 (5 Pages).*
Unknown, What is a smart card? from http://money.howstuffworks.com/question322.htm, 3 pages.*
Unknown, How credit cards work, from http://money.howstuffworks.com/credit-card.htm/printable.*
Unknown, IDTECH: New! MiniSmart, from http://www.id-tech.net/.*
Leonard et al., Automating the credit decision process, Journal of Retail Banking, v. 16, n. 1, p. 39(6), Spring 1994, (from Dialog Classis Web file 648, acc. No. 07816398).*
Quinn, Credit card issuers keeping closer watch on how you pay bills, Apr. 25, 1988, Washington Post, Business section, p. 67.*
Chandler, Credit Scoring, Credit Union Executive, from DialogClassic Web(TM) file 648, Jul. 1985.*
General Counsel's Opinion No. 8—Stored Value Cards, 61 Fed. Reg. 40490, Aug. 2, 1996, <http://wwwfdic.gov/regulations/laws/rules/5500-500.html>.
Song, A card that asks for ID, Time Magazine, Apr. 12, 2004, 1 page.
Credit Card News, "A store card issuer looks for lift from electronic gift certificates," Feb. 1, 1995, 2 pages.
Fickenscher, "Amex prepaid offering is latest card for firms rewarding employees", American Banker, vol. 161, No. 151, Aug. 8, 1996, 2 pages.
Associates First Capital Corporation, Hoover's Inc., The Industry Standard: The Newsmagazine of the Internet Economy, thestandard.net/companies/cpmpany-display, Apr. 6, 1999, 2 pages.
Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.
Brehl, Banks issue cash-card pledge, The Toronto Star, Oct. 9, 1997, 1 page.
Meece, Boatmen's prepaid cards for worker-incentive firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CardEx Incentive, The Future of Gifts & Incentives, Apr. 6, 1999, 15 pages.
CardFlash®, Apr. 5, 2005.
Rosen, Cash Just Isn't Flexible Enough: Shops of the Future Will Only Take Cards, Daily Express, Technology, Feb. 10, 1995, 1 page.
CES/NaBANCO introduces stored value card technology, Blockbuster video is first merchant partner, Business Wire, Jan. 15, 1996, 2 pages.
Common electronic purse specifications, Business Requirements; Version 6.0, Dec. 1998.
Britt, Competing in auto lending, America's Community Banker, vol. 5, No. 11, pp. 33-37, Nov. 1996.
Consortium created to manage common electronic purse specification, Cardtech Securtech, Chicago, www.visa.com/av/news/PRmisco051199.vhtml, May 11, 1999.
D.C. area Safeway stores look for increase in sales volume and revenue with cards, Card News, vol. 6, No. 25, ISSN: 0894-0797, Dec. 30, 1991, 3 pages.
Piskora, Debit Cards Seen Poised for New Markets, American Banker, Credit/Debit/ATM's, Mar. 7, 1995, p. 16.
Electronic Purse, SCIA (Smart Card Insustry Association), About Smart Cards, printed Feb. 23, 2001, www.scia.org,-1 page.
Sanchez-Klein, Electronic purse alliance planned, Computerworld Online News, Jul. 29, 1998, printed Feb. 23, 2001, 2 pages.
Electronic Purse Can Free You From ATM Drag, Business Times, www.btimes.co.za, printed Feb. 23, 2001, 1 pages.
Electronic purse card to be launched tomorrow, New Straits Times, News Clippings, Sep. 18, 1999, printed Feb. 23, 2001, 3 pages.
E-Z Pass, Web page, http://www.ezpass.com/whatis.html, Nov. 12, 2001.
E-Z Pass, Web page, http://www.ezpass.com/frameMain.htm, Nov. 12, 2001.
E-Z Pass, Web page, http://www.ezpass.com/Disc_portNewYork.htm, Nov. 12, 2001.
E-Z Pass, Web page, http://www.ezpass.com/Disc_ny_annual.htm, Nov. 12, 2001.
First Data markets stored-value cards, Cards International, Jan. 30, 1996, p. 5.
Norris, First Data unit develops Blockbuster cash card, Omaha World Herald, Jan. 19, 1996, Sunrise Edition, p. 16.
First Union Issues Smart Cards to Fort Benning Recruits, CardFax, vol. 1999, No. 60, Mar. 26, 1999, 1 page.
First USA—Activate Today and Get One Hour Free Calling Card Calls, 1-800-555-2535, First USA, undated, 6 pages.
ECARD, Frequently asked questions, www.ergeard.com, printed Feb. 23, 2001, 7 pages.
Machlis, Have it the smart way: Burger King program drives smart-card use, Computerworld, printed Feb. 23, 2001, 1 page.
Here's the calling convenience you asked for: 1-800-call-AT&T . . . For All Calls, AT&T, Appendix A: For Card Carriers, 1999, 7 pages.
Konrad, IBM had a bunch of unusual ideas in 2003, www.philly.com, printed Jan. 21, 2004, posted on Jan. 13, 2004, 2 pages.
Coulton, Incentives field moving to card-based series 14, American Banker, Mar. 26, 1998, 3 pages.
Incentive firms find debit cards a rewarding expreience (Off-line debit card issuers converge efforts with companies looking for effective incentives to boost employee productivity and to motivate individuals to buy their products), Debit Card News, vol. 3, No. 11, Nov. 28, 1997, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
MailFrontier Survey Finds that Consumers Hold Financial Institutions Accountable for Online Identity Theft, www.mailfrontier.com, Palo Alto, CA, Nov. 2004.
O'Connor, Maritz gets Mastercard's stamp of approval, Business Travel News, Aug. 19, 1996, 2 pages.
More Retailers Turn to Co-Branding, Chain Store Age Executive with Shopping Center Age, Feb. 1, 1995, 3 pages.
Bogle, Mutual Funds at the Millenium: Fund Directors and Fund Myths, The Vanguard Group, To the '40 Act Institute of PLI (Practicing Law Institute), New York, NY, May 15, 2000, 15 pages.
New 1-800-CALL-ATT campaign promotes one number for all calls, AT&T Marketing, News Release, Feb. 17, 1997, 2 pages.
Dugas, Payroll May Ask: Paper or Plastic?, USA Today, 3B, Aug. 14, 2001, 1 page.
Proton world and Europay to co-operate in creation of new CEPS-complaint E-purse application, Press releases '99, printed Feb. 23, 2001, Waterloo, Belgium, Jun. 28, 1999, 2 pages.
Brown et al., Purchasing Card Magic: Eli Lilly Finds Accounts Payable Flying High With Plastic, Corporate Cashflow, Nov. 1994, 4 pages.
Purse application for cross border use in euro, CORDIS, Pace 1st 1999-11531 Pace, printed Feb. 23, 2001, www.cordis.lu, 3 pages.
Miller et al. Section E.2.1: Kerberos Authentication and Authorization System, Project Athena, Cambridge, Massachusetts, Dec. 21, 1987, 39 pages.
SK100 Smart Card Electronic Purse Balance Reader, printed Feb. 23, 2001, 1 page.
Smart card for loyalty and e-purse applications eclipses calability of conventional mag-stripe cards, Press Release, www.1.slb.com, Apr. 21, 1997, printed Feb. 23, 2001, 3 pages.
Lzarony, "Stuck for a gift? Give a prepaid credit card", www.bankrate.com, Dec. 21, 1998, 1 page.
Souccar, Smart Cards: 1$^{st}$ Union Smart Card Pilot Enlists a Second Army Base, American Banker, 3 pages.
Spurgin, Sopininmon! or What's happening in the retail credit card environment, Credit World Journal, Apr. 1997, 7 pages.
Lacker, Stored Value Cards: Costly Private Substitutions for Government Currency, Economic Quarterly, 1996, 17 pages.

SmartAxis, Load cash on to your e-purse card, Supported Currencies and Schemes, www.smartaxis.co.uk, printed Feb. 23, 2001, 9 pages.

Key, Swift Gift 'Wows' Internet Shoppers, PR Newswire, www.key.com/swiftgift/home.html, Dec. 2, 1998, 1 page.

The Electronic Purse Reaches the Car Park, printed Feb. 23, 2001, 2 pages.

Stuber, The electronic purse: An overview of recent developments and issues, Bank of Canada, Technical Report No. 74, www.bankofcanada.ca, Jan. 1996, printed Feb. 23, 2001, 2 pages.

The Evolution of a New Consumerism, Chain Store Age, vol. 73, pp. 8-9, Jun. 1997, 3 pages.

Stoughton, The Gift of Credit, www.washingtonpost.com/wp-srv/business, Dec. 14, 1998.

ICL, Understanding the benefits, Smartcity offers a number of important benefits to both the card issuers and the customers, www.icl.com, printed Feb. 27, 2001, 2 pages.

Universal card free lifetime membership extended 3 months, AT&T Marketing, www.att.com/press/0297/970217.csa.html, Dec. 4, 1990, 2 pages.

Visa Cash, <www.visa-asia.com/pd/cash/main.html>, Feb. 23, 2001.

Visa Cash—Where can I get it?, <www.visa-asia.com/pd/cash/main.html>, Feb. 23, 2001.

Visa first to launch electronic purse poad via GSM mobile phone, Johannesburg, Mar. 7, 1999, printed Feb. 23, 2001, www.cellular.co, 4 pages.

Visa International and SERMEPA Announce Plans for Cross Border Visa Cash Based on CEPS, <www.visa.com/av/news/praasmisc111699.vhtml>, Nov. 16, 1999, Paris.

Visa releases Visa Cash electronic purse specifications based on CEPS, www.visa.com/av/news/PRaamisc042099.vhtml, San Francisco, Apr. 20, 1999.

Hansell, Visa to unveil electronic purse cards, New York Times, printed Feb. 23, 2001, 2 pages.

Welcome to Card Express, The CardEx Incentive Card, as disclosed in the CardEx web site archive by web.archive.org on Feb. 7, 1998; http://www.web.archive.org/web/*/http://www.cardex.com, retrieve Oct. 18, 2003, 8 pages.

Welcome to Card Express, CardEx web site archived by web.archive.org on Oct. 31, 1996 [http://web.archive.org/web/*/http://www.cardex.com], retrieve Oct. 18, 2003, 7 pages.

Welcome to Swiftgift, Swiftgift, www.swiftgiftcard.com, Dec. 8, 1998, 10 pages.

Machlis et al., Will smart cards replace ATMs?, Computerworld, printed Feb. 23, 2001, 3 pages.

Hoovers, General Mills, Inc. Corporate Profile relied upon to show the history of the company [http:/cobrands.hoovers.com/global/cobrands/proquest/history.xhtml?COID=110639], Jul. 12, 2005, 2 pages.

International Preliminary Examination Report for Application No. PCT/US01/03587 filed on Feb. 9, 2000 and dated Jul. 18, 2002.

International Search Report for Application No. PCT/US01/03587 filed on Feb. 9, 2000 and dated Apr. 27, 2001.

* cited by examiner

CUSTOMER ACTIVATED MULTI-VALUE (CAM) CARD

RELATED APPLICATIONS

This application is a divisional of U.S. patent application Ser. No. 10/370,227 filed on Feb. 20, 2003 now U.S. Pat. No. 7,072,864, which is a divisional of U.S. patent application Ser. No. 09/505,189 filed on Feb. 16, 2000 and now U.S. Pat. No. 6,865,547 B1, which is a continuation application of U.S. patent application Ser. No. 09/193,712 filed on Nov. 17, 1998 and now U.S. Pat. No. 6,032,136.

FIELD OF THE INVENTION

The invention generally relates to transaction and payment cards, including credit cards, bank cards, debit cards, telephone calling cards and the like, and more particularly to a transaction card or payment card which can be activated to have an alternative or secondary use as a credit card by adding a credit feature.

BACKGROUND OF THE INVENTION

Today, credit card usage is virtually a part of a customer's daily life because customers recognize the many advantages of obtaining credit cards. For example, credit cards are safer to carry than money, and they can help a customer to establish a good credit rating. Additionally, they can serve as a source of convenience should the customer need to make an unexpected purchase for which they may not have the cash immediately available. As a result of this growing trend, the credit card industry is a booming and profitable industry; thus, customers are constantly inundated with many different credit card offers. For example, customers are offered department store credit cards, gasoline product cards (oil companies), telephone calling cards, VISA® credit cards, MASTERCARD® credit cards, AMERICAN EXPRESS® credit cards, debit cards, and/or the like.

One of the most appealing features of a credit card purchase is that it allows customers to buy now and pay later. Another advantage is that transaction cards permit customers to establish direct relationship with specific types of business, for example, a telephone calling card or a gasoline product payment card. With a gasoline product card, a cardholder has the convenience of purchasing gasoline products from a specific oil company, without conducting a cash transaction, and receiving one itemized bill at the end of the billing period. The itemized billing statement is beneficial for providing businesses or entrepreneurs with a detail summary, at the end of the month or year, of the amount of gasoline which was purchased during the time period and an easy method to calculate business-related mileage driven during the time period. Another enticement of credit card usage is that some credit card issuers offer to their customers "reward points or reward offers" as an incentive to increase the amount of the customer's purchases or to increase the frequency in which the customer transacts purchases with their credit card.

While customers realize the benefits of obtaining several different types of credit cards and establishing several different types of relationships with different types of industries, customers can sometimes be overwhelmed by the sheer volume of credit cards that they need to carry in order to perform daily activities. Although VISA® and MASTERCARD® are widely accepted, no one card has been accepted universally. Regardless of the fact that VISA® and MASTERCARD® can be used to perform other types of transactions, the usage of a VISA® or MASTERCARD® for the purchase of gasoline or a telephone call usually does not allow the customer to establish a direct relationship with the individual companies enacting the transaction.

Furthermore, using VISA® and/or MASTERCARD® to make a purchase can be more expensive for a merchant because this transaction is treated as a purchase on the VISA® or MASTERCARD® credit card account for which the merchant often pays a transaction fee. Similarly, customers may incur additional expenses when using VISA® and/or MASTERCARD® to perform different types of transactions. For instance, when a customer uses her VISA® credit card to make a telephone call, the telephone company determines the amount of the telephone call and bills the amount directly to the customer's VISA® account. The amount is then entered as a purchase onto the customer's VISA® account and if the customer fails to pay the entire balance by the next billing cycle, the customer also incurs an additional charge based on the current interest rate associated with the account until the entire VISA® account is paid in full. Therefore, a need still exists for a cost-effective method which provides a customer the convenience of using one card which can be easily activated to perform different functions, establish different relationships with different industries (e.g., a phone card, a gas card, a catalog purchasing card, or a dining card) and offer rebate incentives.

Traditionally, the procedure for obtaining a credit card normally requires several steps which can delay the customer's receipt of a functioning credit card for approximately 26-50 days. The normal credit card issuance process begins when the prospective customer receives direct marketing material in the mail or at a merchant's location. Within the next 7-14 days, the prospective customer reads the approximately 500-800 word application, completes the application and returns the application to the credit card issuer through the mail system. Once mailed, it takes another 3-4 days for the paper application to travel through the postal system. The credit card issuer receives the paper application, and over the next 10-20 days, the credit card issuer processes the application to determine whether to accept or decline the customer's application. Thereafter, the customer receives a written response within 5 to 7 days as to whether their application is accepted or declined. If the application is accepted, a functioning credit card often will be included in the written response. After 1 to 5 days, the customer will read the 800-1500 word credit card agreement and then will activate the credit card telephonically before it can be used. However, not all credit card issuers take the additional measure of requiring telephonic activation; some may use a less secure method of mailing active cards.

SUMMARY OF THE INVENTION

The Customer Activated Multi-Value (CAM) card provides a customer with a transaction card with a primary use that is not a credit use, to which the customer can add a credit card feature, as well as other features which can be added to enhance the transaction card's usage. The Customer Activated Multi-Value card can be activated as a non-credit transaction card (e.g., a phone card, a gasoline product card, a catalog purchasing card, a dining card, or the like) or as a transaction card with a credit card feature. Activation of the CAM card as a transaction card allows the customer to purchase goods and services from one specific vendor or several specific vendors who offer the same specific type of product and/or services and to establish a relationship with each vendor for goods or services rendered (for example, a stored-value telephone calling card or gasoline product purchasing card).

An additional enhancement of the CAM card is a rewards feature. The "reward dollars" can be redeemed or spent at the specific vendor or at any other merchant that accepts the transaction logo or mark displayed on the card. Another feature of the CAM card is that it provides the customer with the option to add a credit card feature to the transaction card. By adding the secondary credit card feature to the CAM card, the customer is able to interact with any merchant that accepts traditional credit cards such as VISA®, MASTER-CARD®, AMERICAN EXPRESS®, DISCOVER® or the like. In addition, the "reward dollar" points may be used as a credit against the secondary credit feature to reduce the balance of the secondary credit card feature. Even if the credit feature is not activated, customers can still earn reward dollars, cashing them in at retail outlets that accept logos printed on the card, such as MASTERCARD®, VISA®, AMERICAN EXPRESS®, DISCOVER®, any other major credit card, debit card, or the like. In this instance, the open-to-buy amount is equal to the amount of reward dollars accrued.

The reward dollars of the present invention differs from the reward points disclosed in U.S. Pat. No. 5,025,372, assigned to Meridian Enterprises, Inc. (the "Meridian patent"). In order to receive "credits" to or through his or her credit instrument, a participant in the incentive award program disclosed in the Meridian patent must initially reach certain goals or levels of performance. Unlike the Meridian patent, the CAM card does not require the customer to achieve a certain goal or level of performance in order for the customer to receive a credit towards their primary transaction card or secondary credit card feature. The CAM card customer automatically receives a credit every time the customer uses her primary transaction card to transact a purchase. A certain percentage of the total amount spent during each transaction will be used as a credit towards the balance of the customer's secondary credit card feature, or transaction card feature.

Furthermore, the activation process for the CAM is an automated process which significantly reduces the time in which a customer normally has to wait before she can use an active credit card. The automated activation process of the CAM card provides customers with a secure, quick and easy activation process for selecting one or more of the described options. The overall activation process from the date on which the prospective customer receives the direct mail marketing piece, which includes an inactive CAM card, to the date the prospective customer has a functioning transaction card and/or credit card is reduced from an estimated average of 26-50 days to 1-5 days. The number of distinct steps that the customer performs to possess a functioning credit card decreases by approximately 80%. The process for having an active credit card decreases from an estimated average of 10 steps practiced in the traditional process to two steps employed by the novel automated activation process of the CAM card. Upon receipt of the CAM card, the prospective customer reads the marketing material and if she wishes to add the credit card feature she then reads the 800-1500 word cardmember agreement. The prospective customer telephones the CAM activation center and the customer's activation request is automatically processed over the telephone by a live operator or voice response unit (VRU). As an alternative embodiment, the customer may use a personal computer, the Internet or the like to activate the CAM card.

One object of the present invention is a transaction card which has a "sustainable and independent use" and to which a credit card feature can be added at the prospective customer's request.

Another object of the present invention is to improve the efficiency of the overall process of obtaining a credit card by reducing the time from when a prospective customer receives the marketing information to the time the customer has a functioning transaction card and credit card.

Another object of the present invention is to decrease the number of distinct steps that a customer performs to receive a functioning credit card from an estimated average of 10 steps to 2 steps.

It is a further object to provide transaction cards imprinted with the prospective customer's name in a direct mail marketing piece versus traditional methods of direct marketing materials including a paper application or response form that is mailed back to the transaction card provider where the transaction card is not sent to the customer until the paper application or response is processed and approved.

Another object is to have customers activate their transaction card and add their credit card feature automatically versus applying for a transaction card or credit card by completing a paper application which is sent through the mail; thus easing the application process and enhancing the card's security features.

It is still another object to decrease the chance of credit card fraud by requiring that the prospective customer contact the process center and interact directly with a telemarketing representative.

It is still another object that the activation process between the customer and the process center include several levels of safety features built into the system in order to deter theft and/or fraud.

Another object is that the reward dollars may be used as a credit against the secondary credit feature to reduce the balance of the secondary credit card feature.

It is a further object that even if the credit feature is not activated, customers can still earn reward dollars, cashing them in at retail outlets that accept MASTERCARD® and VISA®.

It is still another object that, if the customer chooses not to apply for the secondary credit feature, the customer may still select the "rewards dollars" feature where the open-to-buy amount is equal to the amount of reward dollars accrued.

DETAILED DESCRIPTION OF PREFERRED EMBODIMENTS

The present invention relates to a computer program utilized in conjunction with a transaction card which can be activated automatically and to which the recipient can add a credit card feature as a secondary use card.

The CAM card system (10) provides customers with a relatively quick and efficient method of obtaining a transaction card which can also function as a credit card or other secondary use, if activated to do so.

Figure 1:
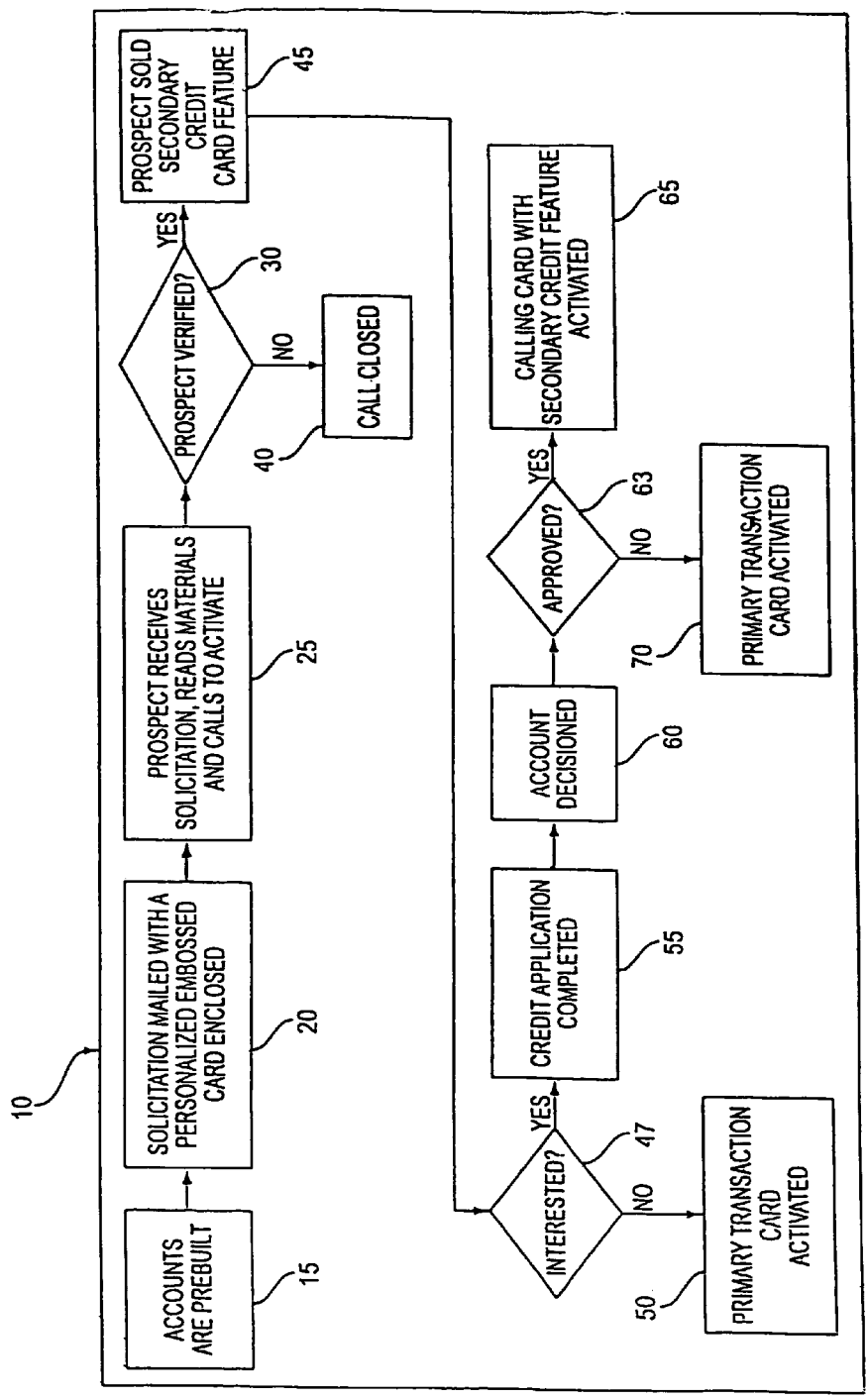
FIG. 1 is a flow diagram of the overall process of the present invention.

Referring to FIG. 1, prior to mailing the solicitations, CAM card accounts are prebuilt (15). The prebuilt accounts (15) provide the system with the capability of automatically activating the customer's account when the customer calls to activate the transaction card (25). The prebuilt accounts (15) are built with a frozen or inactive status; in case the cards are lost or stolen, they cannot be used unless they have been properly activated through the CAM activation process. After the prebuilt accounts (15) are established, an embossing file is created for each prebuilt account. The embossing file is used to emboss the cards with the customers' name and account number. A solicitation, containing the marketing information, is mailed to each customer with a personalized, embossed card enclosed (20). Once the prospective customer receives the solicitation, she reads the materials and, if interested, calls the number listed in the package to activate the transaction card (25). In order to deter theft and/or fraud, the prospect is verified during the activation call (30). The safety features are designed to prompt the system to ask the person calling several different questions to ensure that the person calling is the intended customer. If the prospect is not verified, the call is closed (40). If the person is verified, the system advances to the secondary credit card feature offer (45). The customer is asked by the customer service representative whether the customer wants to add the secondary credit card feature (47). If no, the primary transaction card will be immediately activated (50). If the customer wishes to add the credit card feature, a credit application will be completed (55) and automatically decisioned (60) during the activation call. If approved (63), the primary transaction card including the credit card feature will be activated (65). If the credit application is not approved, only the primary transaction card will be activated (70) automatically during the telephone call.

Figure 2:
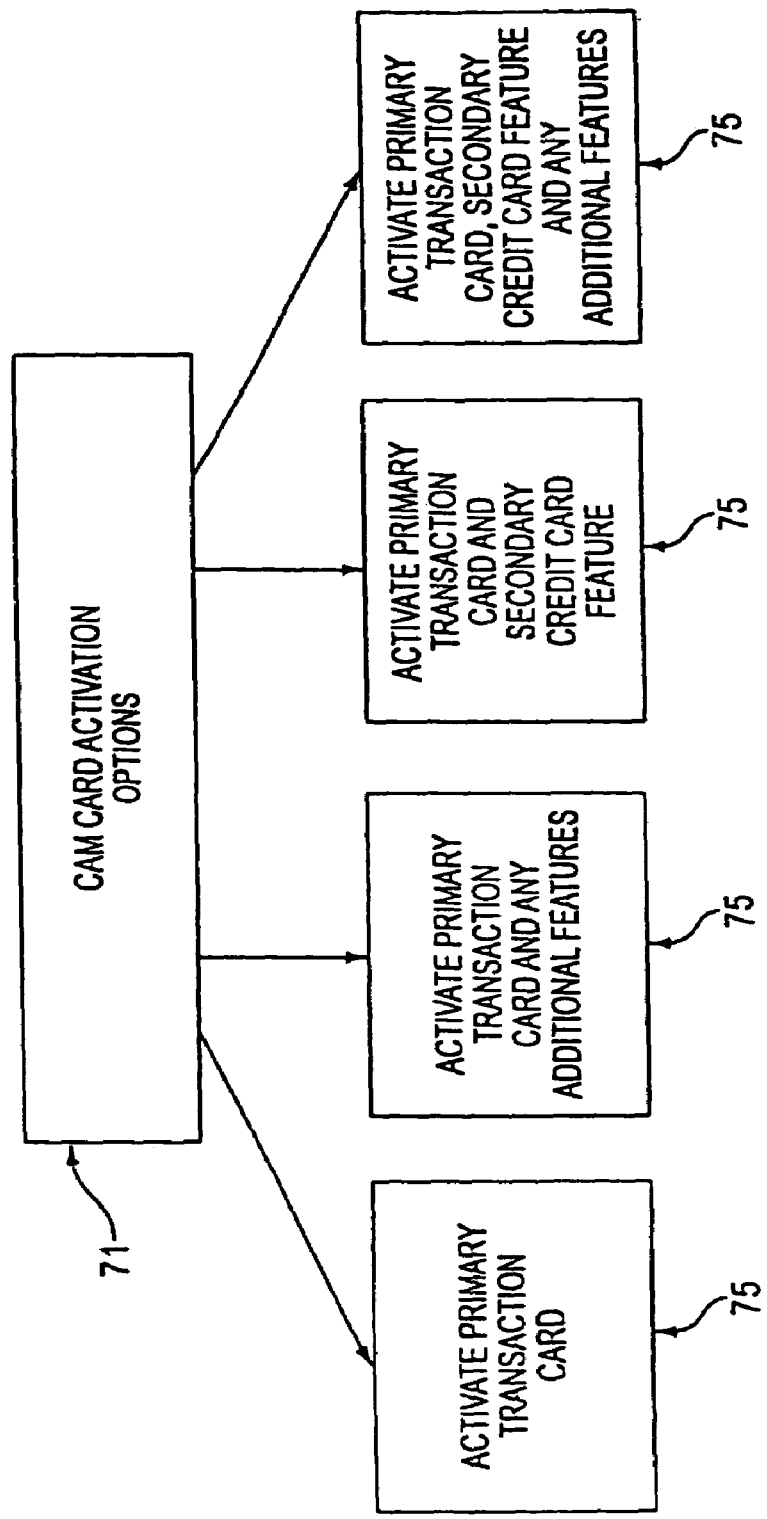
FIG. 2 is a flow diagram of the activation process of the present invention.

More specifically, FIG. 2 illustrates the activation options available to the customer through the CAM card system (71). The customer may decide to activate the primary transaction card feature only (72). Furthermore, the customer may decide to activate the primary transaction feature and add any additional feature(s) (73). In addition to obtaining the primary transaction card, the customer may wish to add the secondary credit card feature (74). Another option provided to the customer is a card that includes the primary transaction card, the secondary credit card feature and any additional features that the CAM system may offer (75).

FIGS. 3A-3D illustrate the basic embodiment of the CAM card activation process telephonically interacting with a live operator, however, a customer may activate the CAM card through the use of a computer, the Internet or the like interacting with a live operator, VRU or a computer. The CAM activation process may be activated by two different initialization processes, the Inbound Call process or Outbound Telemarketing process. The Inbound Call activation process shown in FIG. 3A begins when a prospective customer receives the direct marketing mail piece which contains an inactive transaction card and the optional secondary credit card feature terms and conditions. As detailed in FIG. 2, the customer contacts the CAM card automated activation process center (71) to activate the transaction card (72), to activate the transaction card and the secondary credit card feature (73) or to activate the transaction card, the secondary credit card feature and any additional features (74).

If all customer service representatives are busy addressing other customers' request (97) when the prospective customer contacts the CAM activation processing center, the customer receives a customized message (100) until the next customer service representative is available. Once the next customer service representative is available, the CAM system automatically initiates the activation process by maneuvering the customer through several levels of safety features built into the system. In order to deter theft and/or fraud, the safety features are designed to ask the person calling several different questions to ensure that the person calling is the intended customer.

Initially, when a caller contacts the CAM activation process center, the system initiates the Automatic Number Identification (ANI). The ANI automatically checks the telephone number from which the telephone call is made versus the telephone number stored in the system and automatically displayed by the caller identification feature of the system on the GUI (98). If the caller's stored telephone number matches the telephone number from which the caller is calling and the caller informs the customer service representative that he is not interested in participating in any of the services offered, the customer service representative attempts to find out the reason why the customer is disinterested in the program and enters this information into the system (32). The customer service representative closes the call (33) and updates the file on First Data Resources (FDR) (120). FDR is the data processing and statement generating company used by First USA to maintain First USA's credit card account records. FDR (120), the data processor, receives data as to all charges made on the credit card and posts them to the customer's First USA credit card billing statement. FDR also maintains the CAM-card customers' and potential customers' files.

Referring to Block (30), should the customer inform the customer service representative that she wishes to activate the CAM card and if the caller's telephone number fails to match the telephone number stored in the system, the system (10) instructs the customer service representative to ask the caller for the account number shown on the transaction card (36). Referring to Block (38), if the customer fails to respond with a valid account number, the system prompts the customer service representative to ask the caller whether she is the person whose name is listed on the transaction card (39)." If the caller informs the representative that she is not the person whose name is printed on the transaction card, the customer service representative will inform the caller that the transaction card may be activated only by the person whose name is listed on the card. The customer service representative will then request to speak with the person originally solicited (47) and that the person solicited must call back to activate the card.

Returning to Block (38) if the 13-digit account number fails to match the stored account number and the customer informs the customer service representative that she is the person listed on the card (39), as an additional safety precautionary measure, the customer service representative requests whether the caller is calling from home (41). If the customer indicates that she is calling from home, the system (10) instructs the customer service representative to request the customer's telephone number for the Outbound Telemarketing to call the prospective customer (110) back at a later date. The customer service representative closes out the call since the verification of the customer has failed. The file is updated on FDR (120). The activation center will forward the file to the Outbound Telemarketing process where the customer service representatives will use the newly obtained telephone number to call the prospective customer back, and once the customer identification is verified, the system will attempt the activation process again.

Returning to Block (41) if the customer is not calling from home, the customer service representative informs the customer to call back at a later date from her home telephone (100). Referring back to Block (38), if the account number given by the customer is a valid account number, the customer service representative will ask the customer for their social security number (42). If the last four digits do not match the customer's social security number stored in the system (43), the system returns to Block (110) where the customer service representative requests the customer's telephone number for the Outbound Telemarketing process to call the prospective customer back at a later date. The customer service representative closes out the call since verification of the customer has failed. The file is updated on FDR (120). The activation center will forward the file to the Outbound Telemarketing process where the customer service representatives will call the prospective customer back at a later date and attempt the activation process again once the customer identification is verified.

Referring back to (98), if the customer's telephone number matches the ANI number (30) and the customer is interested in activating the card, the system (10) displays the customer's account number. The customer service representative requests the last eight digits of the account number (37) on the transaction card. If the account number given (51) by the customer fails to match (53) the account number stored in the system or if the customer informs the customer service representative that he or she is unable to provide the transaction card, the system will advance to Block (54). In Block (54), the customer service representative will ask for the customer's telephone number, and the system will automatically forward the customer's account to the Outbound Telemarketing process so that a call can be made to the customer at a later date (54). The customer service representative closes out the call since verification of the customer has failed and updates the file on FDR (120).

Referring back to Block (51), if the 12 digit account number provided by the customer corresponds with the account number stored in the system, the customer has cleared/passed the initial safety precautionary levels and the system automatically moves into the eligibility check (130). Passing the initial safety level means that the ANI (98) correctly identified the caller's telephone number, the eight digit account number provided by the customer matched the information stored within the system and the caller has satisfied all other security checks of the system. Presumptively, clearance of the security check indicates that the "prospective" customer is the person calling to activate the card and has possession of the transaction card. As a result, the system (10) passes the initial safety precautionary questions and automatically performs the eligibility check.

The eligibility check determines what services, if any, the customer has already activated. For a customer who has previously activated the CAM card, the eligibility check (130) also enhances the system's efficiency by preventing the customer from duplicating the initial activation steps each time the customer calls the CAM processing center. Initially, the system (10) checks to verify if the FDR system is down (122). If the FDR is up and operating, the system automatically retrieves the account flags according to the account's current status (140).

If the eligibility check is performed and the customer's account is not assigned a flag of H, I or J, this means that the customer has not previously activated any of the credit services (150). The system will advance the customers account to FIGS. 3B, 3C and 3D respectively, where the customer service representative will attempt to convince the customer activate both the transaction card and add the secondary credit card feature, as well as any other additional features (160).

Returning back to Block (140), if the customer's account generates a flag of H, I or J, this means that the customer has already accepted or activated at least one of the services of the card. If a customer receives a flag of "H," this indicates that the customer has accepted both the transaction card and added the secondary credit card feature. A customer with a "H" flag may want to request a secondary credit card limit increase or may simply wish to speak with the customer service representative about her account. If the customer receives a flag of "I," this informs the customer service representative that the customer has been declined for the credit feature, but accepted the primary transaction card feature. Here, the customer may wish to reapply for the secondary credit card feature in FIGS. 3B and 3C. If the customer receives a "J," the system (10) informs the customer service representative that the customer has been previously declined for the credit feature but rejected the primary transaction card feature. Now, the customer may wish to activate the primary transaction card feature (FIG. 3D) or activate the primary transaction use card and reapply for the secondary credit card feature (FIGS. 3B, 3C and 3D). After the system performs the eligibility check of Block (140), the customer's account is forwarded to either FIG. 3B, 3C, or 3D, depending upon the services desired by the customer (173).

Figure 3A:
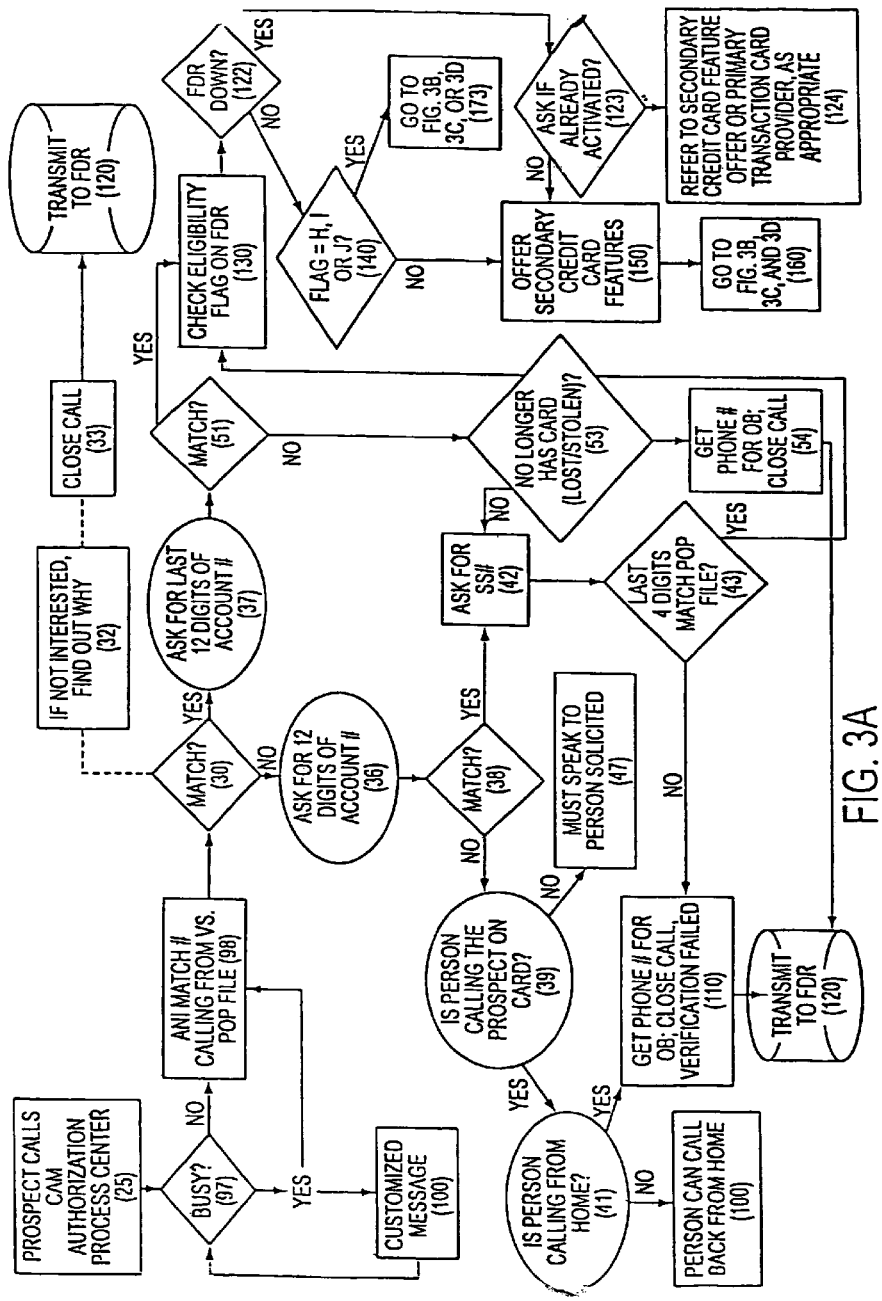
FIG. 3A is a flow diagram of the activation process of the present invention.
Figure 3B:
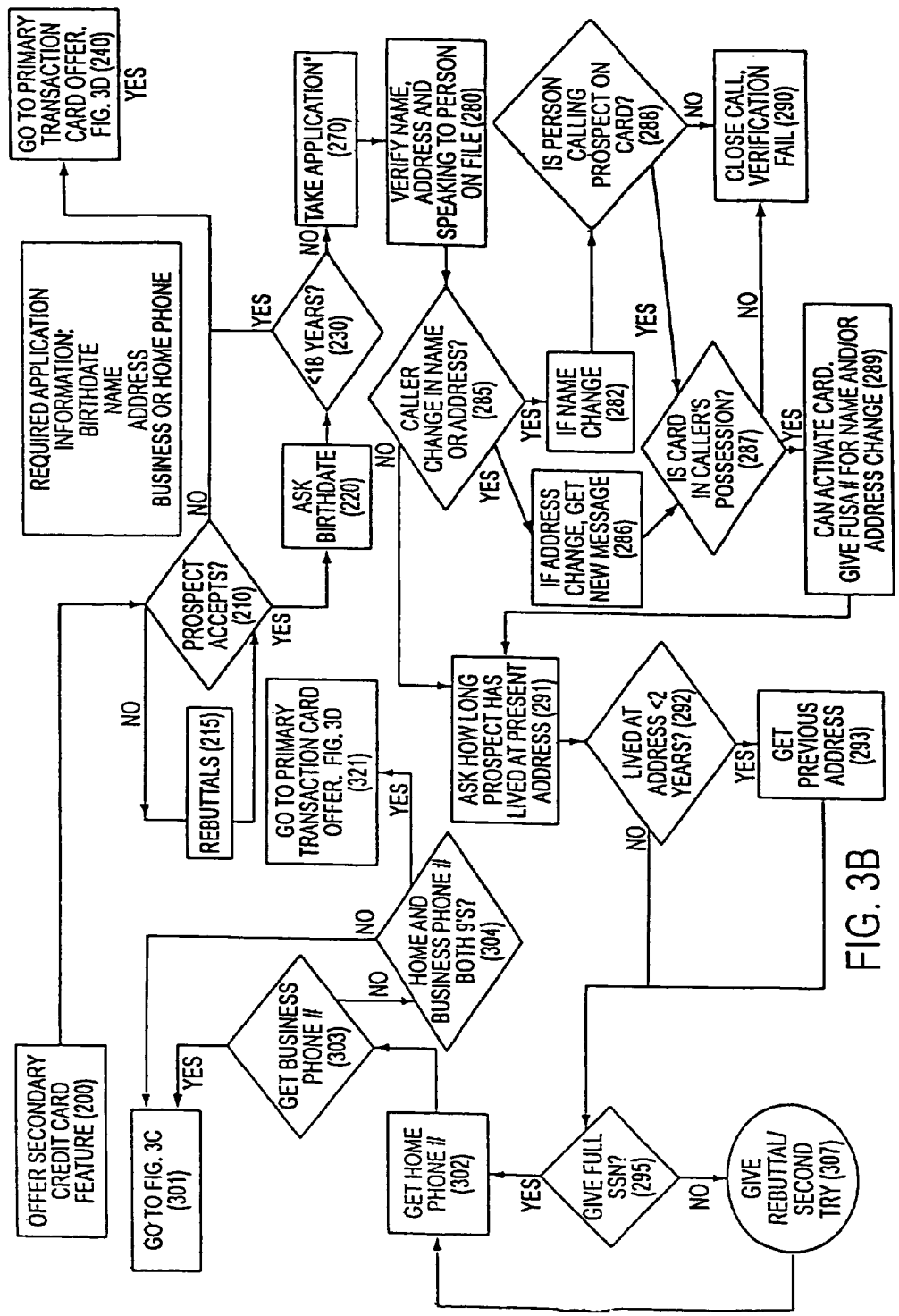
FIG. 3B is a flow diagram of the activation process of the present invention.
Figure 3C:
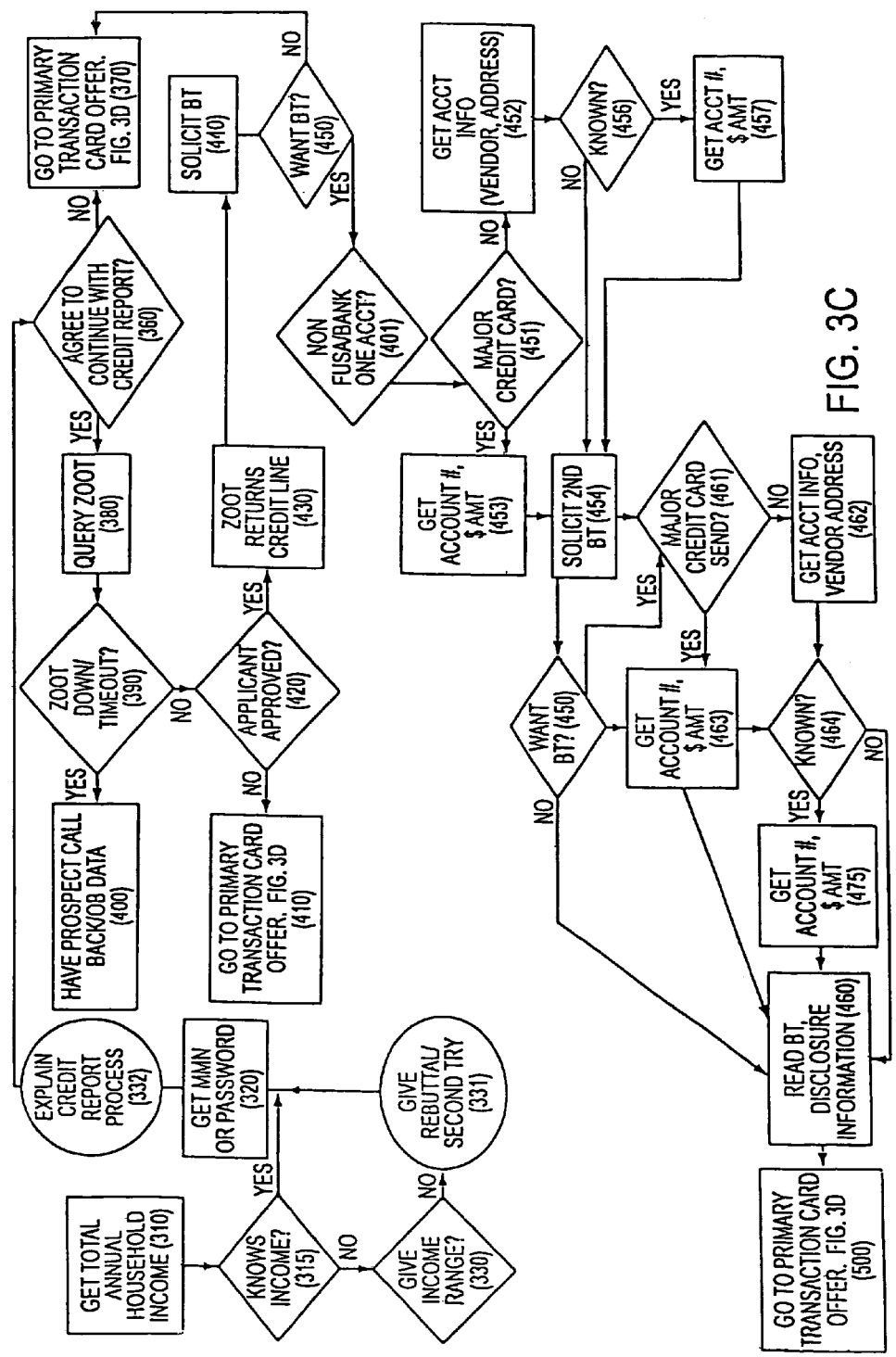
FIG. 3C is a flow diagram of the activation process of the present invention.
Figure 3D:
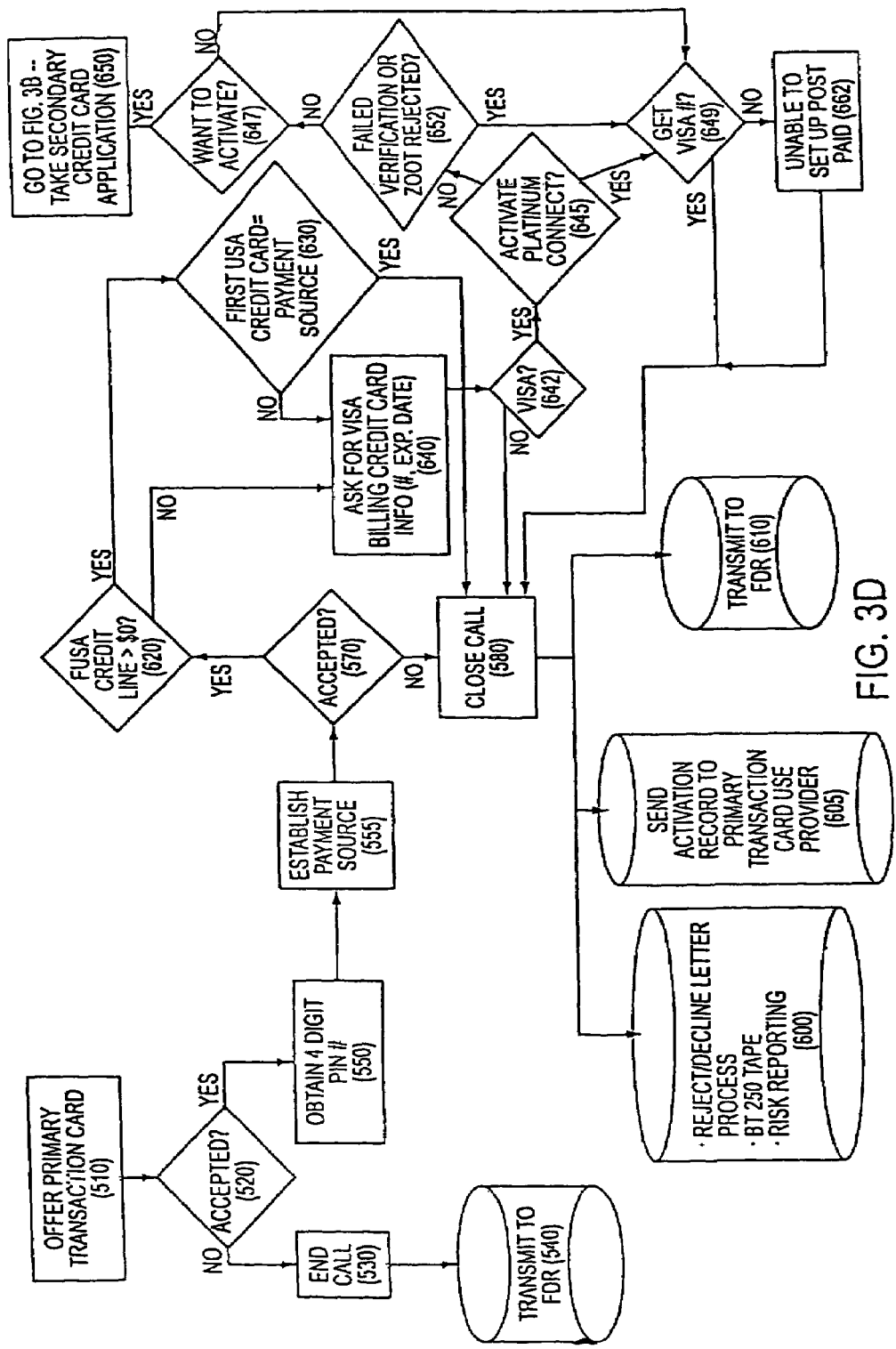
FIG. 3D is a flow diagram of the activation process of the present invention.

Referring back to Block 122 in FIG. 3A, if the FDR system is down, the customer service representative asks the customer if she has already activated the transaction card (123). If the answer is yes, the customer service representative refers the customer's account to the secondary credit card feature offer or to primary transaction card use provider, as appropriate (124). If the answer to Block (123) is "no", then the customer service representative transfers the account to Block (150). The customer is then transferred to block 160 where he is transferred to 3B, 3C, and 3D.

Referring to FIG. 3B, after the customer service representative has made his pitch to the customer to accept the credit card feature (200) and the customer accepts (210), the customer is asked by the customer service representative their birthday (220). If the customer is less than 18 years old, the customer cannot be offered the secondary credit card feature; they can only be offered the primary transaction card use (240). Therefore, the system will forward the customer's account to the primary transaction card use offer (240) which is discussed in FIG. 3D.

Returning to Block (210), if the prospect declines to accept the offer, the customer service representative makes a rebuttal offer in Block (215). This rebuttal is another attempt to get the customer to accept the secondary credit card feature. If the customer declines the credit card feature, the system moves to Block (240) and forwards the customer's account to the primary use offer, in FIG. 3D.

Returning to Block (230), if the customer is over the age of 18, the customer service representative will process the customer's credit card application directly over the phone (270). The information required from the customer to process their credit request over the telephone is the customer's birth date, name, address, and business or home telephone number. The customer service representative will verify the customer's name, address, and, as previously discussed, that the customer service representative is speaking to the person on file (280). If there has been a change in the caller's name or address, the customer service representative will also perform another safety level check (285). If there has been a change in the customer's address, the system will forward to Block (286). After Block (286), the system moves to Block (287) where the customer service representative is prompted to ask the customer if the card is in the caller's possession. If the answer is yes, the card can be activated. The customer will give the customer service representative their new address and telephone number. In Block (291), the customer service representative will then ask the customer "how long have you lived at your present address." If the answer is less than two years (292), the customer service representative will request the customer's previous address (293). The system (10) then moves to Block (295) where the customer is requested to give his full social security number. If the customer refuses to give his full social security number, the customer service representative will try a rebuttal or a second attempt to get the customer to give their full social security number (307). If the customer still refuses to give his or her social security number, the customer service representative will get the customer's home phone number (302) and will then move to Block (303) to get the customer's business phone number. The system (10) then moves to Block (301) where it transfers the customer's account to Block (310) in FIG. 3C.

Returning back to Block (303) in FIG. 3B, if the customer refuses to give his business number, then the system moves to Block (304). If both the home and business phone numbers are both 9's, the system will forward the account to Block (321), where the customer will be offered primary transaction card use services only. Referring to Block (292), if the customer has lived at the present address for more than two years, the customer service representative is not required to get the customer's previous address.

In Block (285), the system documents a change in the customer's name. If there has been a name change (282), the customer service representative will inquire whether the caller is the prospective customer listed on the transaction card (288). If the answer is "yes", the customer service representative will ask the customer, according to Block (287), is the card in the caller's possession. If the answer to Block (287) or (288) is "no", the customer service representative closes the call because the verification has failed (290). If the answer to Block (287) is "yes", the card can be activated under Block (289) and the system (10) follows the same procedure discussed above.

Referring to FIG. 3C, the customer service representative requests the customer's total annual household income (310). If the customer knows his income (315) and provides the customer service representative with this information, the system then moves to Block (320) to get the customer's mother's maiden name or the customer may provide a password. Returning to Block (315), if the customer is unaware of his income or does not wish to provide his exact income, the customer is asked to give an income range (330). If the customer refuses to give an income range, the customer service representative attempts a second rebuttal to get the customer's income (331). After the rebuttal in Block (331), the customer service representative gets the customer's mother's maiden name or password in Block (320). Then the customer service representative explains the process for obtaining a credit report for the customer in Block (332). If the customer does not wish to continue with the credit check (360), the customer account is transferred by the system and will be offered the primary transaction card use only (370). If the customer agrees to the credit check (360), the system connects to the credit card authorization process (ZOOT) under Block (380). If the credit card authorization process is down (390), the system moves to Block (400). In Block (400), the system will then activate the transaction card use only and instruct the customer service representative to inform the customer to call back at a later time or the customer service representative will forward the customer's account to the outbound calling database so that the customer may be called back at a later date in order to activate the secondary credit card feature.

If the credit bureau is up and running, the system performs the credit check. If the applicant is not approved for the credit card in Block (420), the customer account is transferred by the system and the customer will be offered the primary transaction card in FIG. 3D (510). If the customer is approved, the system is routed to Block (430) and automatically returns a credit line based upon the customer's credit check.

Once the customer's credit line has been established, the customer service representative is instructed by the system (10) to solicit a balance transfer from another credit card to the newly approved credit card (440). If the customer declines the balance transfer offer (450), the system (10) sends the account to Block (370) where the account is automatically processed for the primary transaction card feature.

Returning back to Block (450), if the customer agrees to a balance transfer, the balance transfer process is initiated. The system transfers to Block (401) where the customer is asked, "whether the credit card in which they would like to transfer the balance from is a First USA credit card or not." If the answer is "yes", the balance transfer cannot be performed. If the answer is "no", the customer then provides the name of the major credit card account from which the balance is to be transferred. In Block (451), if the balance is being transferred from a major credit card account, the customer service representative requests the account number and the amount under Block (453). If the account is not a major credit card but a retail card or the like, the customer service representative is instructed in Block (452) to get the account number information and the vendor's name and address. If the customer is unable to provide the vendor's name or address, the balance transfer cannot be processed without this necessary information. The customer service representative is instructed to solicit a second balance transfer in Block (454). Returning to Block (452), if the customer supplies the vendor's name and address, the system moves to Block (457) where the customer service representative obtains the customer's account number and the amount that the customer would like to transfer. Once the initial balance transfer has been solicited in Block (453), the customer service representative solicits a second balance transfer under Block (454). The balance transfer process is initiated once again under Block (450). The customer service representative asks the customer "whether she would like to have a second balance transferred or not." If the customer answers "yes," the customer service representative asks what major credit card account would the customer like to transfer the amount from. If it is a major credit card, under Block (461), the customer service representative enters the account name, number and amount to be transferred under Block (463). The system transfers the customer's file to Block (460). Referring back to the second balance transfer in Block (454), if the credit card is not a major credit card under Block (461), the customer service representative requests the account information and the vendor's address under Block (462). If this information is known (464), the customer service representative inputs the account number and the amount to be transferred (475). If the information is unknown under Block (462), the second balance transfer cannot be performed. Only the original balance transfer will be authorized if the initial balance transferred process was completed in the above steps. The system then moves to Block (460) in order to process the first, second, or both the first and second balance transfers. In Block (460), the balance transfer disclosure information appears on the system's GUI and the customer service representative reads the balance transfer disclosure information to the customer.

A condition of the CAM card is that if the customer is approved for and accepts the secondary credit card feature, the customer must also agree to accept the primary transaction card feature. As a result, once the system completes the secondary credit card activation process in FIG. 3C, the system (10) automatically forwards the customer's account to the primary transaction card offer in FIG. 3D for processing.

Referring to FIG. 3D, the customer service representative asks the customer whether or not they would like to accept the primary transaction card feature (510). If the customer declines the primary transaction card offer (520), the customer's account cannot be activated to receive any services. Thus, the customer service representative ends the telephone call (530), closes out the account and updates the file on FDR (540). If the customer has been approved for the secondary credit card feature and now indicates in Block (520) that she does not wish to activate the primary transaction card, the system (10) prompts the customer service representative to remind the customer that the credit card application is contingent upon her acceptance of the primary transaction card. If the customer still declines the primary transaction card, the customer's account will be closed out. The customer service representative will end the call (530) and then update the account on FDR in Block (540).

If the customer agrees to activate the primary transaction card (520), the system advances to Block (550) where the customer is asked to provide a four-digit PIN number. In order to obtain the primary transaction card use feature, the customer must initially agree to establish a payment source (550). The payment source can be a check, credit card or debit card. If the customer wishes to pay by check, the customer simply mails a check to First USA and once the check is approved, the amount of the check is entered as the payment source for the customer's primary transaction card use. In addition, a customer wishing to establish her payment source by check may have her check automatically processed during the telephone call. If the payment source is a credit card account or a debit card account, the customer authorizes First USA to charge the customer's credit card account or debit card account for the payment source amount. The credit card or debit card can be a First USA card or another major credit card or debit card. After the payment source amount is depleted, the customer may recharge the payment source by adding a new amount to their payment source account by credit card, debit card transfer, or by check.

If the customer decides not to establish a payment source (570), the system advances to Block (580), the customer call is closed out and the customer's account is transferred to Blocks (600), (605) and (610), which will be discussed below.

Returning to Block (570), if the customer agrees to establish a payment source account, the system (10) inquires as to whether or not the customer has a First USA credit card account which has an available credit limit greater than 0 (620). The secondary credit card feature obtained in FIGS. 3B and 3C can also serves as the First USA credit card. If the customer responds affirmatively in Block (620), the customer service representative attempts to persuade the customer to use her FIRST USA credit card as her payment source. If the customer has enrolled in the secondary credit card feature, the system prompts the customer service representative to ask the customer, "whether she would like to have her payment source amount of the primary transaction card posted on her new secondary credit card feature account" (630). If the customer decides not to establish her credit card with a First USA credit card, the system advances to Block (640). If the customer agrees in Block (630) to have any charges incurred on her primary transaction card posted on her secondary credit card or her First USA credit card, the CAM card activation process is then complete. The system automatically closes the call in Block (580).

If in Block (620) the customer has previously declined the secondary credit card offer or if the customer's credit application for the secondary credit card has been rejected, the customer may wish to reapply for the secondary credit card in Block (650).

Returning back to Block (620), if the customer's credit card or debt card is not a First USA card, the system then establishes the non-First USA credit card as the payment amount source (640). Under Block (640), the customer must decide whether the payment source amount will be billed to another major credit card, debit credit card or by check. In Block (640) the customer service representative asks the customer to provide information such as the credit card or debit card provider, the credit or debit card account number and/or expiration date of the credit or debit card. Once the customer provides all the account information required in Block (640), the CAM card activation is complete. The system automatically closes the call (580) and advances the customer's account to Blocks (600), (605) and/or (610).

Under Block 600, the system generates a reject/decline letter, the balance transfer information is complied, a risk report is generated, and/or any other necessary information is generated, compiled or processed. The subroutine of Block (605) forwards the customer activation records to the primary transaction card use provider. The customer's account is updated on FDR in Block (610).

Once the primary transaction card feature and/or the secondary credit card feature has been establish, the system includes the "reward dollars" feature, as an additional feature, to the customer's account. The "rewards" points may be used as a credit against the secondary credit feature to reduce the balance of the primary transaction card feature or the secondary credit card feature. On the other hand, the customer may spend her reward dollars in at retail outlets that accept MASTERCARD®, VISA®, AMERICAN EXPRESS®, DISCOVER® or the like. Also, the accrued reward points may be used to obtain certain types of gifts, vacations, or other types of prizes offered through award incentive programs. The reward dollars feature is just one example of the additional use features. Other additional use features are available at the customer's option, such as a travel program, a Christmas savings plan or a gift purchasing program are available at the customer's options.

The Outbound Telemarketing Activation process is similar to the Inbound Telemarketing Process, with few exceptions. The scripting read by the customer service representative to the customer is different to reflect the outbound nature of call, verification is different (since our in-house representatives are contacting offerees in their own home), and population file is different (those who are already activated, or those who have requested not to be solicited are not called). The Outbound Telemarketing Activation process is initiated by an outbound customer service representative calling a prospective customer. Once the prospect is obtained, the Outbound process is the same as the Inbound process, discussed above and illustrated in FIGS. 3A-3D.

Although the invention has been described with particular reference to preferred embodiments which are intended to be illustrative rather than restrictive. Alternative embodiments will become apparent to those skilled in the art to which the present invention pertains without departing from its spirit and scope. Thus, variations and modifications of the present invention can be effected within the spirit and scope of the following claims.

What is claimed is:

1. A system for rewarding the loyalty of a cardholder on a dual account transaction card having a magnetic stripe for storing information of a credit account and a non-credit stored value account, comprising:
    a multi-value card comprising a dual account transaction card for facilitating credit transactions associated with a credit account and further facilitating non-credit transactions associated with a non-credit stored value account,
    wherein the multi-value card comprises a dual account financial transaction card having a machine-readable storage that provides data to facilitate the credit transactions and the non-credit stored value transactions, wherein further the machine-readable storage consists of a magnetic stripe;
    wherein the dual account multi-value card is configured to be swiped at one or more point of sale devices to initiate both of credit transactions and stored value transactions using the same dual account transaction card, wherein the cardholder can initiate either a purchase transaction using the credit account or a purchase transaction using the stored value account whereby the cardholder selects between the credit account and the stored value account for the purchase transaction;
    a computer-implemented loyalty program for calculating a loyalty value based on the credit transactions of the multi-value card, the loyalty value being used to load the non-credit stored value account of the multi-value card; and
    one or more activation units configured to activate the credit account and the non-credit stored value account;
    wherein the cardholder application for the dual account transaction card is processed as part of an integrated application process whereby the credit card account and the non-credit stored value account are established in response to a single cardholder application and wherein the credit account and the non-credit stored value account are linked through the loyalty program as of the time the dual account transaction card is issued or activated; and
    wherein prior to the activation of either the credit account or the non-credit stored value account, the multi-value card contains or is associated with information related to the credit account and the non-credit account.

2. The system of claim 1, wherein the non-credit transactions comprise stored value transactions based on a stored value account that is funded at least in part by rewards generated through usage of credit account.

3. The system of claim 2, further comprising a rebate file produced by a credit card issuing bank, the rebate file containing a rebate based on the credit transactions, the rebate file being used to aid the calculation of the loyalty value.

4. The system of claim 2, further comprising a stored value transaction file produced by a stored value processor, the stored value transaction file being used to aid the calculation of the loyalty value.

5. The system of claim 2, further comprising merchandise sent to the cardholder of the multi-value card based on the loyalty value.

6. The system of claim 1, wherein the magnetic stripe stores at least the account number for each of the credit account and the non-credit account.

7. A method for rewarding a cardholder of a multi-value card comprising a dual account transaction card having a magnetic stripe for storing information of a credit account and a non-credit stored value account, comprising:
    offering to the holder of the multi-value dual account transaction card an activation of a credit feature of the multi-value card;
    offering to the holder of the multi-value dual account transaction card an activation of a non-credit stored value feature of the multi-value card;
    wherein the dual account multi-value card is configured to be swiped at one or more point of sale devices to initiate both of credit transactions and stored value transactions using the same dual account transaction card, wherein the cardholder can initiate either a purchase transaction using the credit account or a purchase transaction using the stored value account whereby the cardholder selects between the credit account and the stored value account for the purchase transaction;
    calculating a loyalty value from credit transactions of the multi-value dual account transaction card by retrieving data from the machine-readable storage consisting of a magnetic stripe, wherein the machine-readable storage provides data to facilitate credit transactions using the credit feature and non-credit stored value transactions using the non-credit stored value feature of the dual account transaction card;
    calculating the loyalty value from non-credit stored value transactions of the multi-value card; and
    loading a non-credit stored value account of the multi-value card by the calculated loyalty value,
    wherein prior to the activation of either the credit feature or the non-credit feature, the multi-value card contains or is associated with information related to the credit feature and the non-credit feature; and
    wherein a cardholder application for the dual account transaction card is processed as part of an integrated application process whereby the credit card account and the non-credit stored value account are established in response to a single cardholder application and wherein the credit account and the non-credit stored value account are linked through the loyalty program as of the time the dual account transaction card is issued or activated.

8. The method of claim 7, wherein the non-credit transactions comprise stored value transactions based on a stored value account that is funded at least in part by rewards generated through usage of the credit account.

9. The method of claim 8, further comprising forming a first transaction premium file if the credit transactions include a first credit transaction.

10. The method of claim 8, further comprising accruing a rebate amount for each credit transaction.

11. The method of claim 7, wherein the magnetic stripe stores at least the account number for each of the credit feature and the non-credit feature.

12. A computer-readable medium having instructions stored thereon for performing a method for rewarding a cardholder of a multi-value card comprising a dual account transaction card having a magnetic stripe for storing information of a credit account and a non-credit stored value account,
the multi-value dual account transaction card having a machine-readable storage, wherein the machine-readable storage consists of a magnetic stripe, wherein the magnetic stripe comprises data relating to one or more credit accounts and one or more non-credit accounts including at least one stored value account, the instructions executable to perform the operations of:
offering to the holder of the multi-value dual account transaction card an activation of at least one credit account of the multi-value card;
offering to the holder of the multi-value dual account transaction card an activation of the non-credit stored value account of the multi-value card;
calculating a loyalty value from credit transactions of the multi-value card, wherein the multi-value card provides data relating to a credit account or a non-credit account to facilitate a credit transaction or a non-credit transaction;
calculating the loyalty value from non-credit stored value transactions of the multi-value card; and
loading a non-credit stored value account of the multi-value card by the calculated loyalty value; and
wherein prior to the activation of any credit account or any non-credit account, the multi-value card contains or is associated with information related to the credit accounts and the non-credit accounts;
wherein the dual account multi-value card is configured to be swiped at one or more point of sale devices to initiate both of credit transactions and stored value transactions using the same dual account transaction card, wherein the cardholder can initiate either a purchase transaction using the credit account or a purchase transaction using the stored value account whereby the cardholder selects between the credit account and the stored value account for the purchase transaction; and
wherein a cardholder application for the dual account transaction card is processed as part of an integrated application process whereby the credit card account and the non-credit stored value account are established in response to a single cardholder application and wherein the credit account and the non-credit stored value account are linked through the loyalty program as of the time the dual account transaction card is issued or activated.

13. The computer-readable medium of claim 12, wherein the non-credit transactions comprise stored value transactions based on a stored value account that is funded at least in part by rewards generated through usage of the credit account.

14. The computer-readable medium of claim 13, further comprising accruing a rebate amount for each credit transaction.

15. The computer-readable medium of claim 12, wherein the magnetic stripe stores at least the account number for each of the credit accounts and the non-credit accounts.

* * * * *